United States Patent
Honkasalo et al.

(10) Patent No.: US 6,219,343 B1
(45) Date of Patent: Apr. 17, 2001

(54) RATE CONTROL TECHNIQUES FOR EFFICIENT HIGH SPEED DATA SERVICES

(75) Inventors: Zhichun Honkasalo, Vantaa; Janne Parantainen, Helsinki, both of (FI); Lin Ma, Fort Worth, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 08/902,236

(22) Filed: Jul. 29, 1997

(51) Int. Cl.[7] ................................. H04B 7/216
(52) U.S. Cl. ............................. 370/335; 370/468
(58) Field of Search .......................... 370/319, 320, 370/335, 395, 441, 252, 465, 468, 329, 330; 379/59; 455/422

(56) References Cited

U.S. PATENT DOCUMENTS

| | | | |
|---|---|---|---|
| 5,257,257 | 10/1993 | Chen et al. | 370/18 |
| 5,621,723 | * 4/1997 | Walton, Jr. et al. | 370/335 |
| 5,640,395 | 6/1997 | Hamalainen et al. | 370/322 |
| 5,708,656 | * 1/1998 | Noneman et al. | 370/320 |
| 5,754,541 | * 5/1998 | Glisic et al. | 370/335 |
| 5,764,405 | * 6/1998 | Alphonsus | 370/341 |

* cited by examiner

Primary Examiner—Chau Nguyen
Assistant Examiner—Alexander Boakye
(74) Attorney, Agent, or Firm—Harry F. Smith; Jerald J. Gnuschke; Steven A. Shaw

(57) ABSTRACT

Methods for controlling data rate allocations to data packet users transmitting packet data over a CDMA cellular communication network are defined which comprises the steps of: evaluating traffic channels and radio capacity allocated for packet data services within the network to determine an available resource for a packet data transmission; employing a rate control algorithm to determine a data rate allocation for the packet data transmission; and limiting the transmit power of a transmitter to provide the determined data rate allocation for the packet data transmission. The methods include a rate control algorithm which determines data rate allocation using a transmission power budget technique and a rate control algorithm which determines data rate allocation using a current system load technique.

10 Claims, 5 Drawing Sheets

RATE CONTROL TECHNIQUES FOR EFFICIENT HIGH SPEED DATA SERVICES

FIELD OF THE INVENTION

This invention relates to cellular telephone network data transmission, specifically to techniques for rate control used by a code division multiple access (CDMA) network to control the data rate allocations to packet data users in the network.

BACKGROUND OF THE INVENTION

Packet data communication is known in cellular telephone systems, as is evidenced by, for example, commonly assigned U.S. Pat. No. : 5,257,257, issued Oct. 26, 1993, entitled "Method of Controlling the Operation of a Packet Switched CDMA Communication Network for Controlling the Operation of Transmitters and Receivers", by X. H. Chen and J. Oksman.

The cellular telephone industry has experienced an explosive growth in the last decade. This growth has driven many communication systems near capacity, particularly in major metropolitan areas. As a communication system's capacity is reached, users experience longer delays. Thus, innovative techniques are required to optimize system throughput and minimize delays.

In conventional circuit switched communication networks, users are offered a traffic channel based on a first-come, first-served basis. If the communication network reaches its maximum capacity, calls are blocked. In order to serve a predicted amount of user traffic while maintaining an acceptable level of blocking, the network must reserve sufficient capacity, i.e. traffic channels. The number of channels reserved to ensure sufficient capacity may be calculated from the Erlang B formula.

In contention based packet data networks, packet data requests are also served on a first-come, first-served basis. However, blocking levels are reduced by setting a limit on the maximum transmitted packet length. Thus, traffic channels are shared by the packet data users in a time multiplexed fashion. As the input load increases within the packet data network, users start to experience longer delays. Rate control for the packet data networks operating in a time multiplexed fashion is straightforward. The efficiency of the packet data network is determined by the speed at which the network allocates and releases traffic channels. Based on the nature of packet data transmissions, packet data networks can be quite stable and efficient, as long as the average input load is below a specified level.

When CDMA networks based on the TIA/EIA/IS-95A, Mobile Station-Base Station Compatibility Standard for Dual-Mode Wideband Spread Spectrum Cellular System, hereinafter simply referred to as IS-95A, offer packet data services they offer circuit switched call setup. Therefore, a CDMA network employing IS-95A can not offer the function of fast traffic channel allocation or releasing as needed for the packet data traffic. Using the conventional circuit switched Erlang B formula, the network is inefficient since the call duration for a packet data transmission is normally much shorter than a switched call.

Thus, a rate control strategy is needed in CDMA networks which improves channel utilization for packet data users while it reduces delays due to blocking.

Objects and Advantages of the Invention

It is a first object and advantage of this invention to provide an efficient technique for transmitting packet data over a cellular communication network that overcomes the foregoing and other problems.

Another object and advantage of this invention is to define techniques of rate control used by a code division multiple access (CDMA) network to control the data rate allocations to packet data users in the network.

Another object and advantage of this invention is to define techniques of rate control used by a CDMA network to optimize total system throughput, minimize user delay, and to offer more user traffic capacity per cell.

SUMMARY OF THE INVENTION

The foregoing and other problems are overcome and the objects of the invention are realized by methods in accordance with embodiments of this invention. More particularly, this invention is directed to solving the problem of inefficient packet data transmission in CDMA based mobile communication networks.

The present invention applies to, by example, IS-95A based CDMA networks which are planned for circuit switched traffic, i.e. speech, which at the same time, offer packet switched data services via circuit switched call setup procedures. In the present invention, the entire CDMA carrier may be dedicated for packet data services, or speech and data services can be mixed on the same carrier. However, the rate control algorithms as defined by the present invention are intended to be applicable to the packet data services.

In accordance with the present invention, a base station (BS) of a CDMA based mobile communication network defines a certain number of traffic channels for packet service within a cell. Additionally, a certain radio capacity is defined for packet services. In the CDMA network, the radio capacity is measured by the transmission power needed for the service. The number of traffic channels and radio capacity, referred to collectively as network resources, are increased or decreased from time to time in order to maintain a certain level of service.

Currently, under conventional methods of packet data service in IS-95A, when a packet arrives from the interworking function (IWF), e.g. internet, it is put into a buffer. A circuit switched call setup procedure is then triggered which evaluates the network resources in order to allocate a traffic channel for the transmission from the BS to a mobile station (MS), or from the MS to the BS. At the time the traffic channel is allocated a certain data rate is also determined for the transmission. At the end of the packet transmission, the traffic channel is either released immediately or else is released upon the expiration of an inactivity timer.

In the preferred embodiment of the present invention, two rate control algorithms may be employed to determine the most efficient data rate allocation for a packet data transmission. First, the transmission power of the BS for packet data service is evaluated in order to control the sharing of available network resources among the users. Second, the current system load of the cell is evaluated in order to control the peak data rate allocated per user transmission. Note that, in both algorithms, the amount of total transmit power from one BS for packet service is directly proportional to the radio capacity used by the packet service in that cell on the forward link. Thus, the network controls the capacity occupied by a packet data user by limiting the transmit power needed to provide a specific data rate to that user. The transmit power is dependent upon the location of the user within the cell. That is, the transmit power is determined by the path loss from the user to the serving BS. For the same data rate, the larger the path loss the higher is the required transmit power from the BS, and thus the radio capacity consumed by the user is greater. As such, the maximum data throughput is achieved when the MS with the smallest path loss is given the highest data rate.

In the present invention, the second technique for rate control evaluates the current system load level in order to determine a suitable data rate. This technique determines the current system load level by evaluating several parameters including, for example, the current load measured as the number of network resources already allocated, the maximum system load measured as the total number of network resources which may be allocated within the cell for packet data services, and data rate requests from the current packet data connections.

In accordance with the present invention, the total data throughput of the BS is monitored. The monitoring is required because the network has a theoretical upper bound of total throughput. For example, the network may become unstable as it approaches 50% to 75% of the maximum load. Thus, the existing load is used so that the peak user rate allocated is inversely proportional to the current load. For example, a light load means that a high peak rate is allocated, while a heavy load means only a low bit rate is allowed.

In the preferred embodiment of this invention, if a request is received and the network does not have the packet resources to offer, the request is placed into a queue until the resources become available. However, in very heavy loads the queue may become excessively large, so to maintain the stability of the network the oldest requests in the queue are dropped when the buffer is full. For example, assuming the buffer has a limit of queuing 40 requests, a request older than the 40th which has not been served is dropped as new requests are queued. By employing a request queue the system maintains stability by blocking some packet requests.

In the preferred embodiment of the present invention it is possible for the network to offer priority, e.g. service options, to each MS. Thus, one service option may receive a more favorable allocation than another. Alternatively, priority can be ignored and an average available rate can be given to each requesting MS. In either case, the algorithms defined in detail below, are for users that are within the same service priority.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
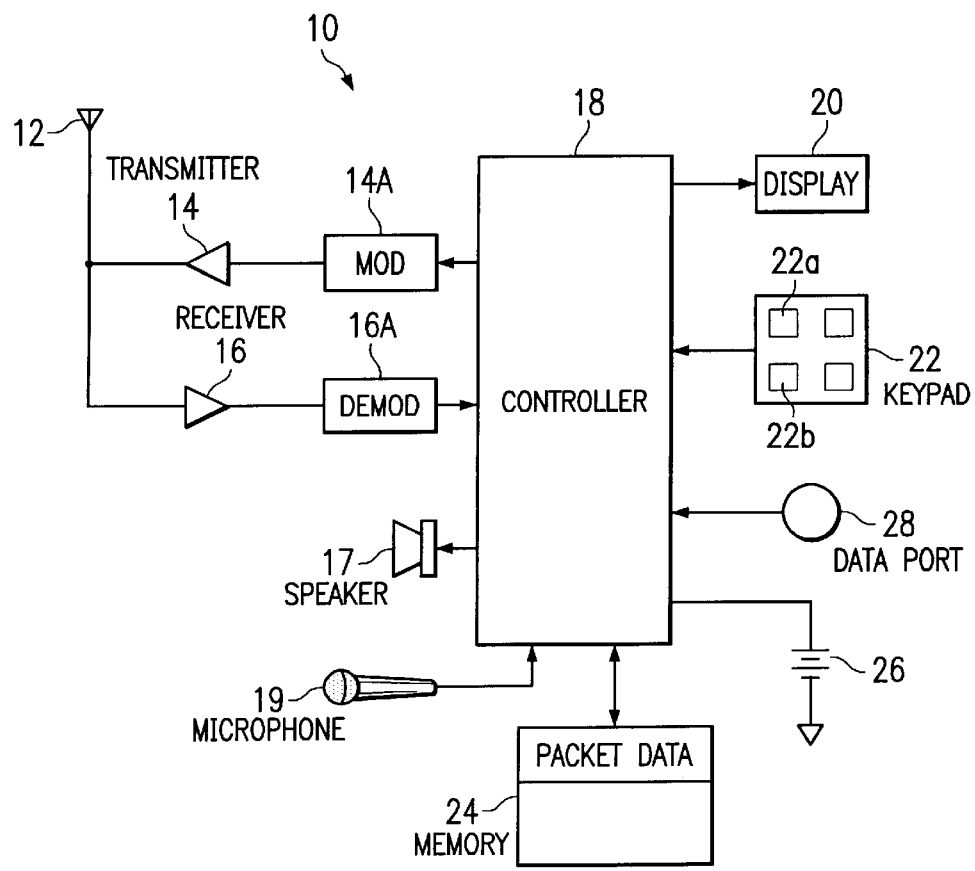
FIG. 1 is a block diagram of a cellular terminal that is suitable for practicing this invention.
Figure 2:
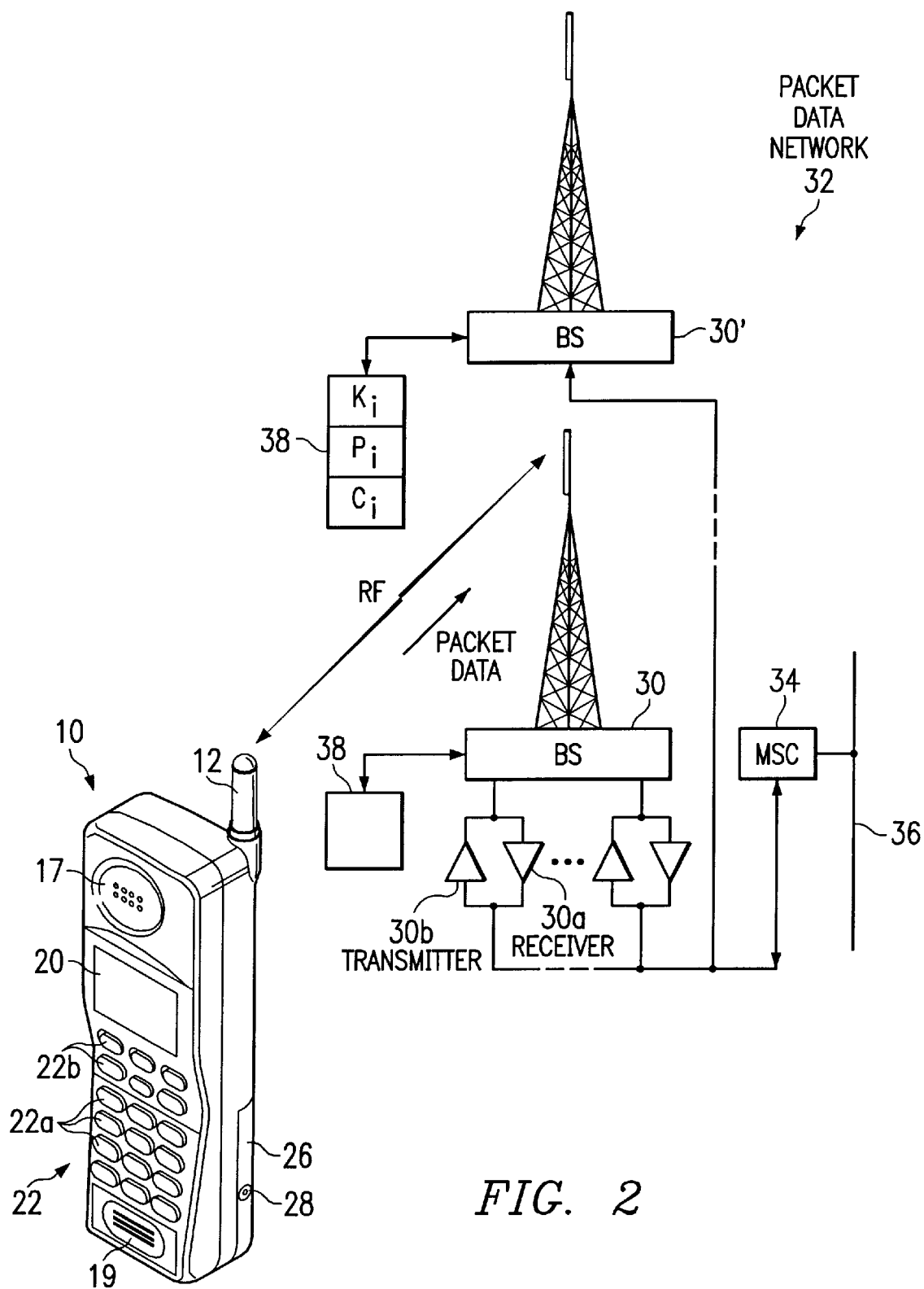
FIG. 2 depicts the terminal of FIG. 1 in communication with a CDMA cellular network.

Reference is first made to FIGS. 1 and 2 for illustrating a wireless user terminal or mobile station (MS) 10, such as but not limited to a cellular radiotelephone or a personal communicator, that is suitable for practicing this invention. The MS 10 includes an antenna 12 for transmitting signals to and for receiving signals from a base site or base station (BS) 30. The BS 30 is a part of a cellular network 32 that includes a mobile switching center (MSC) 34, and a plurality of additional BSs, such as BS 30'. Each BS, for example BS 30, services an associated cell within the network 32 and is assumed to include a plurality of receivers 30a and transmitters 30b, some of which can be allocated for packet data services. Additionally, each BS 30 includes various local memories, shown collectively as the memory 38, wherein are stored a plurality of constants and variables that are used during the operation of the base station 30. For example, the local memory 38 may include routines for implementing the methods described below in relation to FIGS. 3a–3b, 4a–4b, and 6.

The MSC 34 provides a connection to landline trunks when the mobile station 10 is involved in a call. It is assumed for the purposes of this invention that the network 32 supports packet data service. For example, the network 32 may be coupled to a packet data network 36 such as the internet, and/or to a LAN or WAN.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signaling information in accordance with the air interface standard of the applicable cellular system, and also user speech and/or user generated data. The air interface standard is assumed for this invention to include a capability to convey packet data.

In the presently preferred embodiment of this invention the modulator 14A, transmitter 14, receiver 16, and demodulator 16A are adapted to operate with a code division multiple access (CDMA) system, such as one specified in IS-95A. It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

The mobile station 10 is capable of voice transmissions also, and thus includes a user interface comprised of a conventional earphone or speaker 17, a conventional microphone 19, a display 20, and a user input device, typically a keypad 22, all of which are coupled to the controller 18. The keypad 22 includes the conventional numeric (0–9) and related keys (#, *) 22a, and other keys 22b used for operating the mobile station 10. These other keys 22b may include, by example, a SEND key, various menu scrolling and soft keys, and a PWR key. The mobile station 10 may also include a battery 26 for powering the various circuits that are required to operate the mobile station.

It should be realized that in other embodiments the mobile station 10 may function only as a data terminal for at least one of transmitting or receiving packet data. The mobile station 10 which functions as a data terminal can include a data port 28 which is coupled to the controller 18. As a data terminal, certain of the user interface components described above may not be included. It should also be appreciated that in some embodiments the mobile station 10 may not be mobile at all, but may be operated at a fixed location (for example, as a component of a wireless facsimile machine in an office environment).

The mobile station 10 also includes various memories, shown collectively as the memory 24, wherein are stored a plurality of constants and variables that are used by the controller 18 during the operation of the mobile station. For example, the memory 24 may store the values of various cellular system parameters and the number assignment module (NAM). An operating program for controlling the operation of controller 18 is also stored in the memory 24 (typically in a ROM device). The memory 24 may also store packet data prior to transmission or after reception.

Packet data service options provide a mechanism of establishing and maintaining traffic channels for packet data service. A packet data service option is negotiated during call origination or at a later time during a call. The details of establishing packet data service can be found in, by example, IS-95A, IS-657, and IS-99.

In FIGS. 3a, 3b, 4a, and 4b logic flow diagrams are depicted which illustrate two BS rate control algorithms employing transmission power budget techniques. The following table summarizes the variables used within these logic flow diagrams:

$P_t$=BS budget transmission power for all packet services within a cell;
$P_i$ the ith connected BS' current total transmission power that has been allocated, i.e. the amount of capacity that has been used;
$C_i$=the ith connected BS' current transmission power to the requesting mobile;
d=the requesting mobile's current data rate; and
n=the number of connected BS in the soft handoff.

The variable i=1, 2, 3, . . . , n represents each BS within the network. Also, note that the above mentioned variables may be stored by each BS within its local memory 38.

Figure 3:
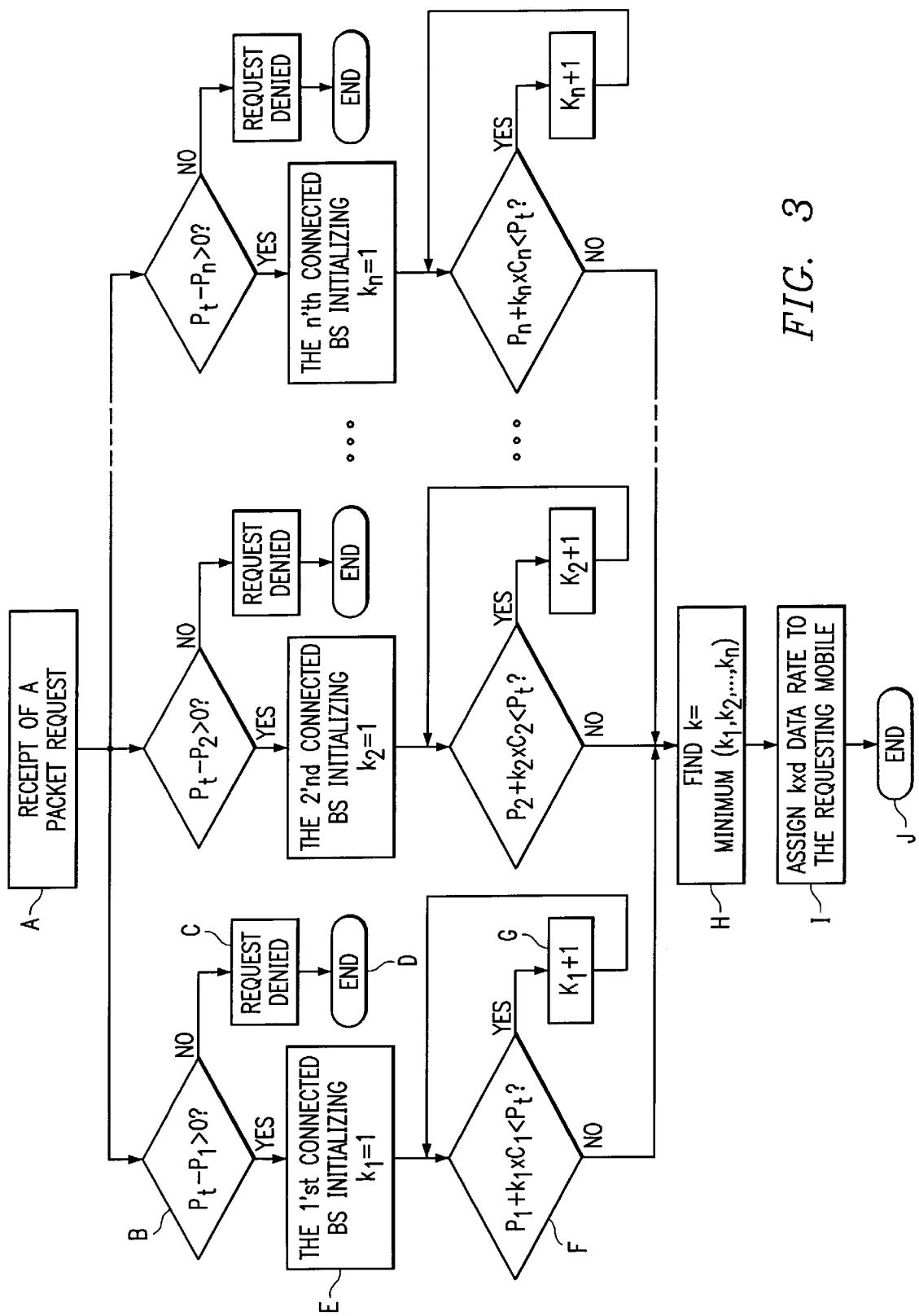
FIGS. 3a and 3b depict a logic flow diagram, according to the invention, for a BS rate control algorithm employing the transmission power budget technique wherein the BS receives one request at a time.

In FIGS. 3a and 3b a logic flow diagram is depicted, according to the invention, for a rate control algorithm employing the transmission power budget technique. This logic flow is performed by the network when it receives one request at a time. As shown in FIG. 3a, rate control begins, at Block A, upon the receipt of a packet data transmission request. Before processing a new request the network determines the total capacity that is still unused within each BS, i.e. the capacity that is free to be allocated. This determination is made at each BS but, for purposes of illustration, only one BS is discussed.

At Block B, the first BS' total budget transmission power for packet services, $P_t$, is compared to the current total transmission power allocated by the BS, $P_1$. If the result of the comparison at Block B is "NO", i.e. there is no capacity to be allocated, then the packet data transmission request is denied, at Blocks C and D, by the first BS. If the result of the comparison at Block B is "YES" for the first BS, then the evaluation continues at Block E.

At Blocks E through G, the first BS calculates the transmission power needed by a MS for a given data rate. In the preferred embodiment, the given data rate is the maximum available data rate which can be assigned to the MS without causing an overflow of the cell. The first BS calculates the maximum available data by first, at Block E, initializing a data rate variable, $k_1$. Once the data rate variable is initialized, a comparison is performed, at Block F. At Block F, the current total transmission power that has been allocated, $P_1$, is added to the transmission power to be made available to the requesting MS, $k_1$–$C_1$. The transmission power to be made available contains the data rate variable, $k_1$, which represents the maximum available data rate which is to be determined. Next the algorithm, at Block F, compares the current total transmission power plus the transmission power to be made available to the BS' total budget transmission power for packet services, $P_t$. If the result of this comparison is "YES", i.e. the current total transmission power plus the transmission power to be made available ($P_1$+$k_1$×$C_1$) is less than the BS' total budget transmission power for packet services, $P_t$, then the data rate variable, $k_1$, is increased, at Block G. The comparison process, Blocks F and G, continues until the maximum value of $k_1$ is determined, i.e. the maximum is found when the result of the comparison is "No".

As discussed above, the transmission power to be made available is determined at each BS within the network. Thus, the connection designated "1" is followed to Block H, on FIG. 3b, in which the maximum determined data rates for each BS within the network are compared. At Block H, the minimum data rate is selected among the $k_1$ to $k_n$ determined data rates. Note, the minimum date rate is selected because this is the maximum available considering the restriction from all the base stations. Therefore, at Block I, the network assigns the minimum data rate to the requesting MS. The algorithm then ends at Block J. Also, for both the reverse link and the forward link, in the case where the requesting MS is in a soft handoff, the minimum data rate allocation among the BSs servicing packet requests is accepted by the requesting MS.

Figure 4A:
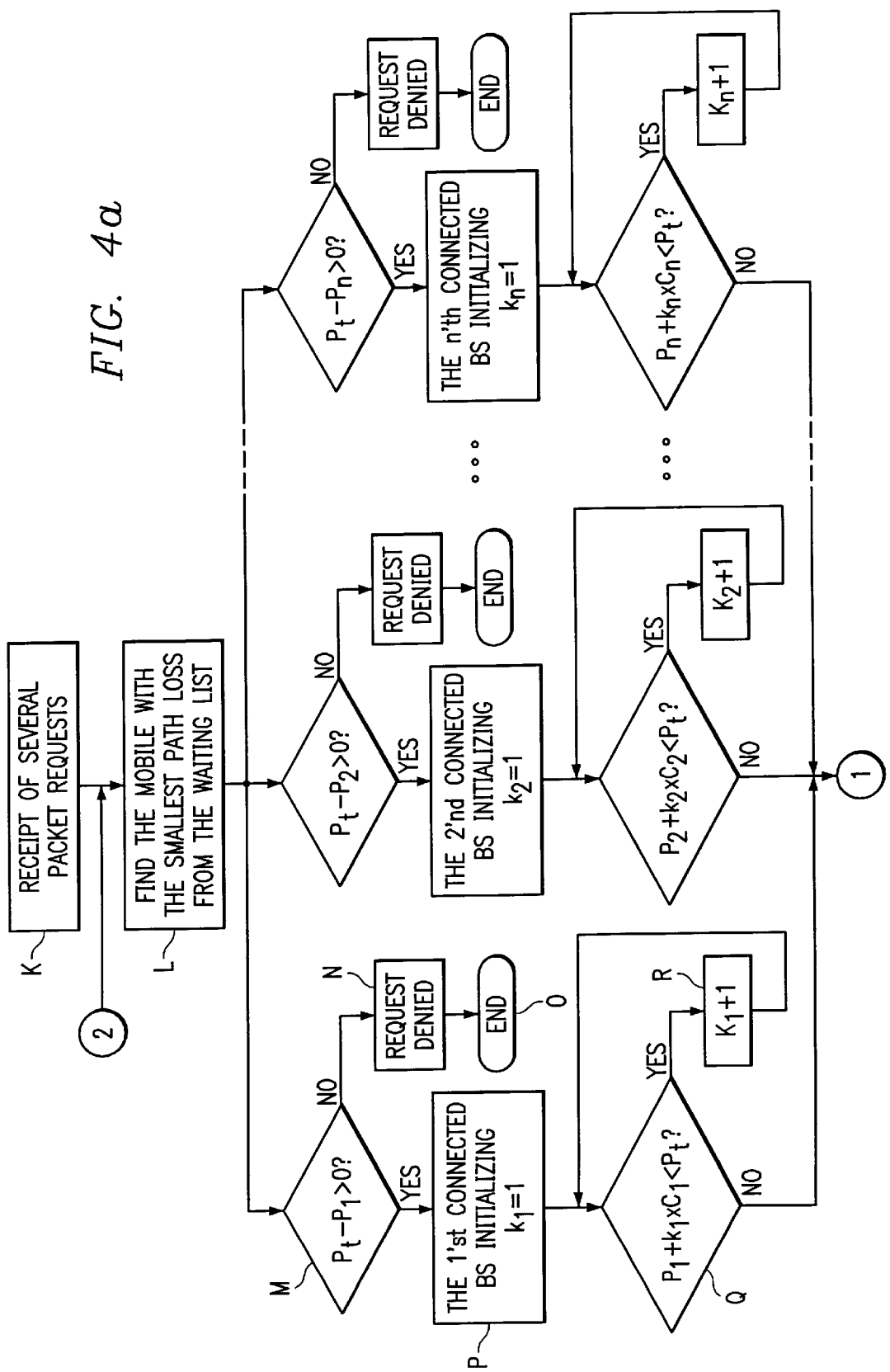
FIGS. 4a and 4b depict a logic flow diagram, according to the invention, for a BS rate control algorithm employing the transmission power budget technique wherein the BS receives a plurality of requests at a time.
Figure 4B:
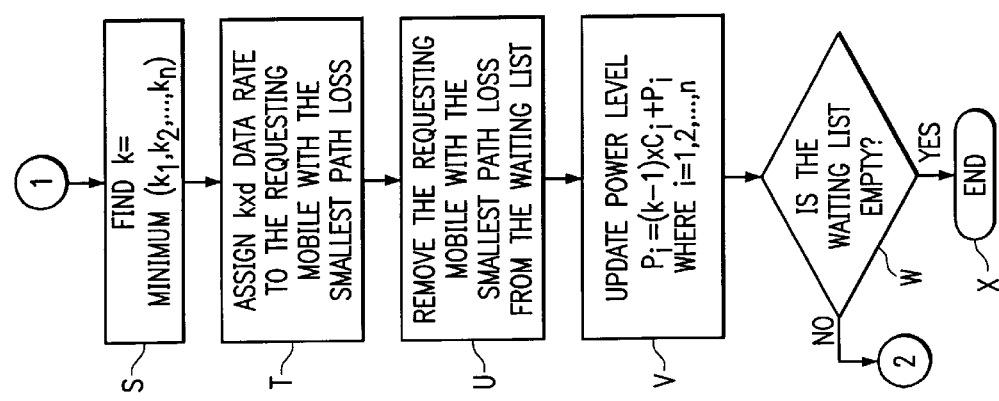

In FIGS. 4a and 4b a logic flow diagram is depicted, according to the invention, for a rate control algorithm which again employs the transmission power budget technique. However, this logic flow is performed by the network when it receives several requests at a time. As shown in FIG. 4a, rate control begins, at Block K, upon the receipt of several packet data transmission requests. Each of the requests is placed in a waiting list from which a MS is chosen. At Block L, each MS within the waiting list is evaluated in order to determine which MS has the smallest path loss.

As explained above, with reference to the single request rate control algorithm, the maximum value for the data rate at which each BS transmits packet data to the requesting MS is determined. That is, like the single received request algorithm, Blocks M through R of the multiple received request algorithm are executed to compare each BS' total budget transmission power for packet services, $P_t$, to the current total transmission power allocated by the BS, $P_1$ through $P_n$, and to calculate the transmission power needed by the requesting MS to support a maximum available data rate, the maximum being defined as a value which does not cause an overflow of the cell.

Once the maximum available data rates are determined for each BS and request, the connection designated "2" is followed to FIG. 4b, Block S. At Block S, the minimum available data rate per request is determined. At Block T, the network assigns the minimum data rate to the requesting MS. Once the assignment is performed the requesting MS is removed from the waiting list, at Block U. At Block V, each BS' power level is updated to reflect the determined data rate. The power of each MS is adjusted so that it increases in proportion to the higher rate transmission. This algorithm assumes that the incremental step in the data rate is equivalent to the current rate of the MS. The incremental step in the data rate can also be a fraction of the current rate (1/u), or a multiple of the current rate (w times the current rate), where $C_i$ would be replaced by ($C_i$/u) or ($C_i \times w$) in Block V.

The waiting list is next evaluated, at Block W, to determine if a MS request is still in the queue. If a request remains the evaluation loops back to Block L and the smallest path loss is again determined. This process continues until the waiting list is empty and the algorithm ends at Block X.

Thus, by employing the rate control by transmission power technique the network's resources for packet data service are first allocated to requesting users that can be served with the smallest path loss.

In operation, the transmission power algorithm first determines the available capacity of a BS for packet data transmission. Assuming a variable "c" defines an amount of Watts of transmit power budgeted by the BS for all packet services in the cell, and a variable "y" defines an amount of Watts of transmit power the BS has already allocated, then the amount of capacity that is still unused in the cell, i.e. the capacity that is free to be allocated, is defined by the formula (x−y). Upon receiving a new packet data request, the BS calculates the transmit power needed by the user for a given data rate and determines if capacity exists to process the request. The BS uses the average transmit power per traffic channel as a measurement of how economic a rate to offer the requester. If the transmit power needed by the requester is above the average value, then it is regarded as an uneconomic allocation. Thus, less transmit power is allocated to the requester so that an uneconomic allocation is not made even if the higher than average capacity could have been accommodated. If a MS is granted a higher data rate, but the transmission power does not increase accordingly, then the entire connection operates at a less optimum Eb/No operating point, and the MS sees more transmission errors. This may also cause a call to be dropped.

Note that, in the present invention, path loss is not measured directly. Instead, the forward link power control information is evaluated, wherein a higher transmission power is assumed to mean a larger path loss. Additionally, the present invention assumes that the MS has already setup a low data rate traffic channel with the BS, before any higher speed channel is granted.

Figure 5:
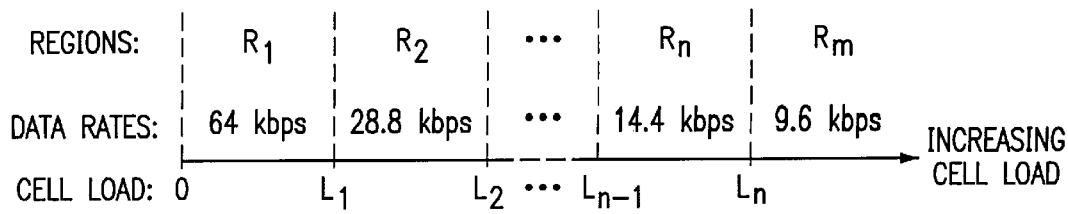
FIG. 5 is a graphical representation, according to the invention, of the load within a specific cell served by a BS of a CDMA cellular network.

In FIG. 5 a graphical representation is shown of the current load and the load thresholds within a specific cell serviced by a BS employing the current system load rate control algorithm. Note that load thresholds, $L_1$ through $L_n$, define load conditions after which a different data rate is allocated. That is, data rate regions ($R_1$ through $R_m$) are defined by the $L_1$ through $L_n$ load thresholds. Each data rate region has been assigned a specific data allocation rate. For example, region $R_1$ transmits packet data at a rate of 64 kbps, region $R_2$ transmits packet data at a rate of 28.8 kbps, region $R_n$ transmits packet data at a rate of 14.4 kbps, and region $R_m$ transmits packet data at a rate of 9.6 kbps. Thus, a BS employing the rate control by current load algorithm assigns a requesting MS one of the 1 to m data rates identified in FIG. 5. The rate allocation depends on which region the current system load is properly placed within. The rate control by current system load algorithm is outlined in FIG. 6, and described in detail below.

Figure 6:
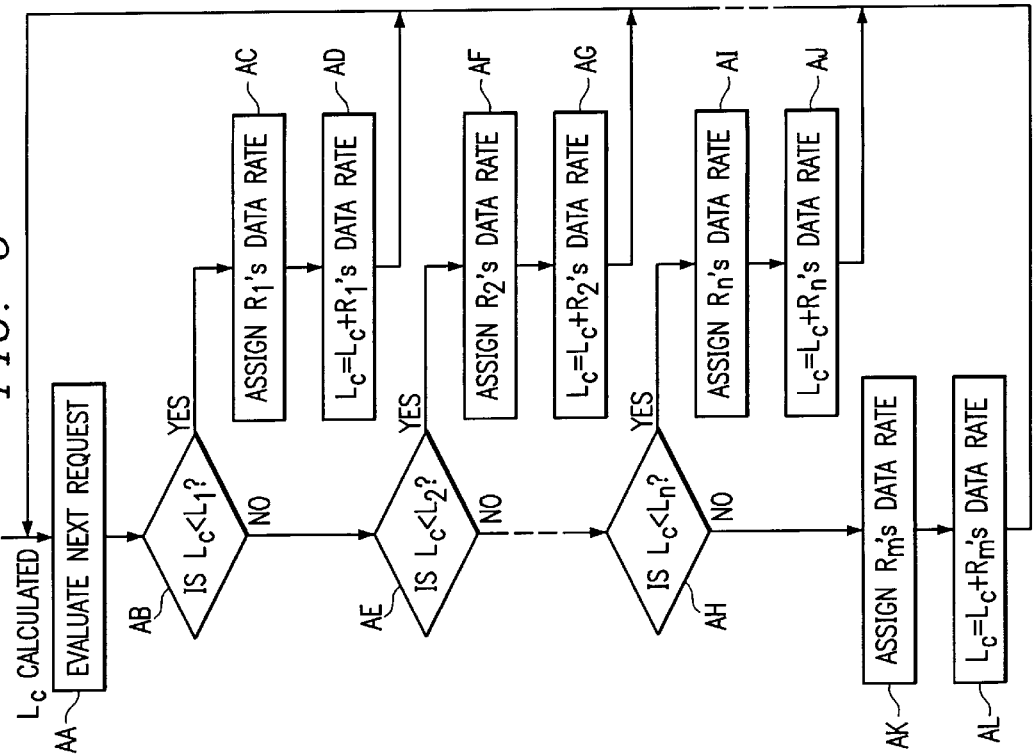
FIG. 6 depicts a logic flow diagram, according to the invention, for a BS rate control algorithm employing the current system load technique wherein the BS receives one request at a time.

In FIG. 6, a logic flow diagram is depicted, according to the invention, for the rate control algorithm employing the current system load technique. As illustrated in FIGS. 5 and 6, and as described above, the BS applies the algorithm to determine which of 1 to m data rates to assign the requesting MS for its packet data transmission. Before discussing the rate control algorithm, it is noted that the maximum number of data rate regions, m, is equal to n+1, where n, the maximum number of load thresholds, is a predefined number set by each cell.

The following table summarizes the variables used within the logic flow diagram of FIG. 6:

$L_c$=the current load of the cell, that is, the total kbps allocated to packet users in the cell;

$L_i$=a predetermined load threshold, where i=1 to n and n, the maximum number of load thresholds, is predefined by the network at each cell; and $R_j$=data rate regions, wherein within a region a specified data rate is allocated. Note, the number of regions, j=1 to m and varies as the number of load thresholds, i, varies. That is, for a particular data rate region j=i, and the maximum number of data regions, m, is defined as m=n+1.

First, before beginning the current system load algorithm, the current load of the cell, $L_c$, is determined. This initial current load is measured by, for example, the number of Walsh codes that are already in use.

Once the initial load of the cell is determined the algorithm begins. First, at Block AA, a transmission request is received. At Block AB, the current load of the cell, $L_c$, is compared to the first predetermined load threshold, $L_1$. If the current load is less than the first threshold, $L_1$, the data transmission rate associated with the $R_1$ region is assigned to the requesting MS. That is, the "YES" condition of Block AB is met and control is passed to Block AC where the data rate assignment is performed. Note that, the associated transmission rate is inversely proportional to the current load. That is, because the current load is light, e.g. below the first predetermine threshold, a heavy transmission rate is assigned the requester, e.g. 64 kbps versus 28.8 kbps or 9.6 kbps in the other regions. At Block AD, once the $R_1$ region's transmission rate is assigned to the requesting MS the current cell load is increased to reflect the new assignment. After the new current load is calculated control returns to Block AA where the next request is processed.

Referring again to the comparison at Block AB, if the comparison of the current load to the first load threshold was "NO", that is, if the current load is greater than the first threshold, then control is passed to Block AE. At Block AE the current load, $L_c$, is compared to the second load threshold, $L_2$. If the current load is less than the second threshold, $L_2$, the data transmission rate associated with the $R_2$ region is assigned to the requesting MS. That is, the "YES" condition of Block AE is met and control is passed to Block AF where the $R_2$ region's data rate is assigned. As in the first threshold's processing, at Block AG, once the $R_2$ region's transmission rate is assigned to the requesting MS the current cell load is increased to reflect the new assignment. After the new current load is calculated control returns to Block AA where the next request is processed.

Processing as described above for the first and the second load thresholds, $L_1$ and $L_2$, is performed for each of the 1 to n load thresholds. Thus, data rates associated with each of the 1 to n data rate regions may be assigned. Processing changes slightly when the current load, $L_c$, is greater than each of the 1 to n load thresholds, $L_1$ to $L_n$. FIG. 6 illustrates this condition at Block AH. That is, the "NO" condition of Block AH is followed and control passes to Block AK. At Block AK, a default data rate region is entered. The default data rate region, $R_m$, defines the data rate allocation at which a packet is transferred when the current system load, $L_c$, is greater than each of the predefined load thresholds, $L_1$ through $L_n$. Once the default data rate is assigned processing continues as defined by each of the previous data rate regions. That is, at Block AL, the current cell load is increased to reflect the assignment of the default data rate and control is returned to Block AA where the next request is processed. Rate control by the current system load algorithm continuously applies the logic as outlined above and as shown in FIG. 6 until all the requests for packet transmission are processed.

Thus, by employing the rate control by the current system load technique the peak data rate allocated per user transmission is controlled.

The following demonstrates that data throughput is maximized by selecting the MS with the smallest path loss. First, assuming the number of MSs that acquire high speed data is N, while the data rates of all the MSs in the network start from D kbps. Also, letting the transmission power for the ith MS=$P_i$, and letting $$\overline{P_i}$$

denote the transmission power for the ith MS after the rate control algorithms have been applied. For convenience, let the transmission power for the closest MS to the farthest MS be represented by the equation:

$$\overline{P_0} \leq \overline{P_1} \leq \ldots \leq \overline{P_{N-1}}$$

If the maximum transmission power is C and the total data throughput is T, then T can be expressed by the equation:

$$T = \sum_i D \times \frac{\overline{P_i}}{P_i},$$

with $$\sum_i \overline{P_i} = C,$$

where $$\overline{P_i} \geq 0,$$

which is equivalent to:

$$T = \sum \frac{D}{P_i} \times \overline{P_i}.$$

Let $\alpha_i = \frac{D}{P_i}$, since $P_0 \leq P_1 \leq P_{N-1}$, we have $\alpha_0 \geq \alpha_1 \ldots \geq \alpha_{N-1}$, then we have:

$$T = \alpha_0 \times \overline{P_0} + \sum_{i=1}^{N-1} \alpha_i \times \overline{P_i}$$

$$T = \alpha_0 \times \left(C - \sum_{i=1}^{N-1} \overline{P_i}\right) + \sum_{i=1}^{N-1} \alpha_i \times \overline{P_i}$$

$$T = \alpha_0 \times C - \alpha_0 \sum_{i=1}^{N-1} \overline{P_i} + \sum_{i=1}^{N-1} \alpha_i \times \overline{P_i}$$

$$T = \alpha_0 \times C - \sum_{i=1}^{N-1} (\alpha_0 - \alpha_i) \times \overline{P_i}$$

Therefore in order to maximize T, the transmission power for the ith MS, $$\overline{P_i}$$

should be minimized because $\alpha_0, \alpha_1, \ldots, \alpha_{N-1}$ are constant and $\alpha_0 \geq \alpha_i$ for i=1, 2, ..., N-1. Since we have:

$$\overline{P_0} + \sum_{i=1}^{N-1} \overline{P_i} = C,$$

minimizing $\overline{P_i}$ means maximizing $\overline{P_0}$

Thus, in order to maximize total data throughput T, $\overline{P_0}$ should be as high as possible.

Using the same argument above, we have the same conclusion

If C−$\overline{P_0}$>0, then let C=C−$\overline{P_0}$.

for $\overline{P_1}$.

Continuing this until C≤0, then the set $$\overline{P_0}, \overline{P_1}, \ldots, \overline{P_{N-1}}$$

is the one which maximize the total data throughput.

While the invention has been particularly shown and described with respect to preferred embodiments thereof, it will be understood by those skilled in the art that changes in form and details may be made therein without departing from the scope and spirit of the invention.

What is claimed is:

1. A method for controlling data rate allocations to data packet users transmitting packet data over a code division multiple access (CDMA) cellular communication network, comprising the steps of:

evaluating traffic channels and radio capacity allocated for packet data services within the network to determine an available resource for a packet data transmission;

employing a rate control algorithm to determine a data rate allocation for the packet data transmission; and controlling the radio capacity occupied by the packed data user by limiting the transmit power of a transmitter required to provide the determined data rate allocation for the packet data transmission;

wherein said rate control algorithm increases system throughput by assigning the highest available data rate to a packet data user having the smallest path loss.

2. A method for controlling data rate allocations according to claim 1, wherein the rate control algorithm determines the data rate allocation using a transmission power budget technique.

3. A method for controlling data rate allocations according to claim 2, wherein the transmission power budget technique for receiving a single transmission requests at one time comprises the steps of:

determining an unused capacity of each BS within the network that is allocatable for packet data transmission;

wherein the unused capacity of each of the BSs within the network is allocatable, calculating a maximum available data rate assignable by each of the BSs to a requesting MS without causing an overflow of a cell;

comparing the maximum available date rates of each of the BSs within the network and selecting a minimum data rate which results in a smallest path loss; and assigning the BS within the network with the minimum data rate to the requesting MS for packet data transmission.

4. A method for controlling data rate allocations according to claim 3, wherein the step of determining the unused capacity of each of the BSs within the network that is allocatable for packet data transmission further comprises the step of;

comparing the total budget transmission power for packet services ($P_t$) of each of the BSs within the network to a current total transmission power allocated by the BS ($P_i$) according to the following formula, $$P_t - P_i.$$

5. A method for controlling data rate allocations according to claim 3, wherein the step of calculating a maximum available data rate assignable by each of the BSs to the requesting MS without causing the overflow of the cell further comprises the steps of;

initializing a variable ($k_i$) which represents a data rate in which packet data is transmitted by each of the BSs;

calculating a transmission power level to be made available to the requesting MS by multiplying the data rate ($k_i$) by a current level of transmission power ($C_i$);

adding the transmission power to be made available ($k_i \times C_i$) to a current total transmission power allocated by the BS ($P_i$) wherein a proposed total transmission power allocation for each of the BSs is produced; and performing a cyclic comparison of a total budget transmission power for packet services ($P_t$) of each of the BSs to the proposed total transmission power allocation for each BS according to the following formula, $$P_i + (k_i \times C_i) < P_t;$$

wherein when the total budget transmission power for packet services ($P_t$) exceeds the proposed total transmission power allocation for each of the BSs, incrementing the variable ($k_i$) which represents the data rate in which packet data is transmitted, recalculating the transmission power level to be made available to the requesting MS ($k_i \times C_i$) so that the proposed total transmission power allocation for each of the BSs is incremented, and continuing the cyclic comparison.

6. A method for controlling data rate allocations according to claim 2, wherein the transmission power budget technique for receiving several transmission requests at one time comprises the steps of:

adding to a waiting list each received MS transmission request;

evaluating each transmission request in the waiting list to determine a selected MS with a smallest path loss from the waiting list;

assigning the BS with the minimum data rate to the selected MS from the waiting list for packet data transmission;

removing the selected MS request from the waiting list; and updating a current total transmission power level to be made available for each of the BSs according to the following formula, $$P_i = (k-1) \times C_i + P_i;$$

wherein a cyclic process of evaluating the received transmission requests, assigning the BS with the minimum data rate, removing the selected MS request from the waiting list, and updating the current total transmission power level is performed until the waiting list of transmission requests is empty.

7. A method for controlling data rate allocations according to claim 6, wherein the step of evaluating each transmission request in the waiting list to determine the smallest path loss from the waiting list further comprises the steps of;

determining an unused capacity of each of the BSs within the network that is allocatable for packet data transmission;

wherein the unused capacity of each of the BSs is allocatable, calculating a maximum available data rate assignable by each of the BSs to the requesting MS without causing an overflow of a cell; and comparing the maximum available date rates of each of the BSs within the network and selecting a minimum data rate which results in a smallest path loss.

8. A method for controlling data rate allocations according to claim 1, wherein the rate control algorithm determines the data rate allocation using a current system load technique.

9. A method for controlling data rate allocations according to claim 8, wherein the current system load technique for transmission requests from a MS to a BS having i=1 to n load thresholds and j=1 to m data rate regions where m=n+1, comprises the steps of:

determining a current load of a cell ($L_c$) allocated to packet data users for packet transmission;

comparing an ith load threshold, $L_i$, to the current system load, $L_c$, according to the following formula, $$L_c < L_i;$$

wherein when the ith load threshold is greater than the current system load, assigning a data rate associated to a jth data rate region, $R_j$, to the requesting MS, and recalculating the current system load by adding the data rate associated to the jth data rate region to the current system load;

wherein when the nth load threshold is not greater than the current system load, assigning a data rate associated to an mth data rate region, $R_j$, to the requesting MS, and recalculating the current system load by adding the data rate associated to the mth data rate region to the current system load; and wherein a cyclic process of comparing load thresholds, assigning data rates, and recalculating the current system load is performed until all the transmission requests are processed.

10. A cellular communication system, comprising:

at least one base station having a transmitter and an associated cell; and at least one mobile station located within said cell, said at least one mobile station providing packet data services;

wherein said base station comprises a controller for evaluating traffic channels and radio capacity allocated for packet data services within said cell to determine an available resource for a packet data transmission;

said controller employing a rate control algorithm to determine a data rate allocation for a packet data transmission;

said controller controlling said radio capacity occupied by said mobile station by limiting said transmit power of said transmitter to that required to provide said determined data rate allocation for said packet data transmission; and said rate control algorithm increases system throughput by assigning the highest available data rate to a mobile station having the smallest path loss.

* * * * *